United States Patent
Lee et al.

(10) Patent No.: US 11,627,573 B2
(45) Date of Patent: *Apr. 11, 2023

(54) METHOD FOR TRANSMITTING AND RECEIVING SIGNAL BY TERMINAL IN WIRELESS COMMUNICATION SYSTEM AND APPARATUS THEREFOR

(71) Applicant: LG ELECTRONICS INC., Seoul (KR)

(72) Inventors: Seungmin Lee, Seoul (KR); Hanbyul Seo, Seoul (KR); Inkwon Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/405,880

(22) Filed: Aug. 18, 2021

(65) Prior Publication Data

US 2021/0377940 A1     Dec. 2, 2021

Related U.S. Application Data

(63) Continuation of application No. 16/746,147, filed on Jan. 17, 2020, now Pat. No. 11,129,162, which is a
(Continued)

(51) Int. Cl.
*H04W 72/04* (2009.01)
*H04W 72/0446* (2023.01)
*H04L 5/00* (2006.01)

(52) U.S. Cl.
CPC ........... *H04W 72/0446* (2013.01); *H04L 5/00* (2013.01); *H04W 72/042* (2013.01)

(58) Field of Classification Search
CPC .............. H04W 72/02; H04W 72/042; H04W 72/0446; H04W 56/0005; H04W 72/0406;
(Continued)

(56) References Cited

U.S. PATENT DOCUMENTS 9,438,334 B2   9/2016   Ji et al.
9,699,781 B2   7/2017   Nguyen et al.
(Continued)

OTHER PUBLICATIONS

Sharp, "Remaining Issues for Explicit L1 Reconfiguration Signaling," 3GPP TSG RAN WG1 #75, R1-135727, Nov. 2013, 6 pages.
(Continued)

*Primary Examiner* — Hoang-Chuong Q Vu
(74) *Attorney, Agent, or Firm* — Lee Hong Degerman Kang Waimey

(57) ABSTRACT

The present invention relates to a method and an apparatus for transmitting and receiving a signal by a terminal in a wireless communication system supporting reconfiguration of wireless resources. Specifically, the method comprises a step of monitoring wireless resource reconfiguration control information on a number of sub-frames within a set monitoring cycle in order to reconfigure wireless resources, wherein a first uplink-downlink setting in accordance with wireless resource reconfiguration control information is valid only if equally detected on a number of sub-frames, and wherein a number of sub-frames are sub-frames set to monitor wireless resource reconfiguration control information of a terminal.

12 Claims, 11 Drawing Sheets

Related U.S. Application Data continuation of application No. 15/106,267, filed as application No. PCT/KR2014/012527 on Dec. 18, 2014, now Pat. No. 10,582,492.

(60) Provisional application No. 61/917,930, filed on Dec. 18, 2013.

(58) Field of Classification Search
CPC ....... H04L 5/00; H04L 5/0007; H04L 5/0048; H04L 5/0035; H04L 5/0053
See application file for complete search history.

(56) References Cited

U.S. PATENT DOCUMENTS

| | | | |
|---|---|---|---|
| 9,705,642 | B2 | 7/2017 | Seo et al. |
| 9,844,054 | B2 | 12/2017 | He et al. |
| 10,924,246 | B2 * | 2/2021 | Guo .................... H04L 5/0094 |
| 2013/0044652 | A1 | 2/2013 | Wang et al. |
| 2013/0286902 | A1 | 10/2013 | Chen et al. |
| 2014/0153453 | A1 * | 6/2014 | Park .................... H04B 7/2656 370/280 |
| 2014/0192704 | A1 | 7/2014 | Yi et al. |
| 2014/0198680 | A1 | 7/2014 | Siomina et al. |
| 2014/0233470 | A1 * | 8/2014 | Kim .................... H04L 5/0053 370/329 |
| 2014/0269451 | A1 | 9/2014 | Papasakellariou et al. |
| 2014/0269454 | A1 | 9/2014 | Papasakellariou |
| 2014/0293843 | A1 | 10/2014 | Papasakellariou et al. |
| 2014/0334355 | A1 | 11/2014 | Ekpenyong et al. |
| 2014/0376460 | A1 | 12/2014 | Hooli et al. |
| 2015/0003301 | A1 | 1/2015 | He et al. |
| 2015/0023269 | A1 | 1/2015 | Lee et al. |
| 2015/0029910 | A1 * | 1/2015 | He .................... H04L 5/14 370/280 |
| 2015/0043396 | A1 | 2/2015 | Ekpenyong |
| 2015/0085712 | A1 | 3/2015 | Wang et al. |
| 2015/0098380 | A1 | 4/2015 | Tseng |
| 2015/0124663 | A1 | 5/2015 | Chen et al. |
| 2015/0131536 | A1 | 5/2015 | Kaur et al. |
| 2015/0250017 | A1 | 9/2015 | Ingale et al. |
| 2015/0264678 | A1 | 9/2015 | Yin et al. |
| 2015/0312937 | A1 | 10/2015 | Suzuki et al. |
| 2015/0341816 | A1 | 11/2015 | Lee et al. |
| 2016/0029239 | A1 | 1/2016 | Sadeghi et al. |
| 2016/0205680 | A1 | 7/2016 | Nguyen et al. |
| 2016/0212744 | A1 * | 7/2016 | Lyu .................... H04W 72/0446 |
| 2016/0242162 | A1 | 8/2016 | Yao et al. |
| 2016/0269104 | A1 | 9/2016 | Lee et al. |
| 2016/0309471 | A1 | 10/2016 | Lee et al. |
| 2017/0295565 | A1 | 10/2017 | Golitschek Edler von Elbwart et al. |
| 2018/0070356 | A1 | 3/2018 | He et al. |
| 2018/0139689 | A1 | 5/2018 | Wang et al. |
| 2019/0313435 | A1 | 10/2019 | Tabet et al. |
| 2020/0154432 | A1 | 5/2020 | Lee et al. |

OTHER PUBLICATIONS

Huawei, et al., "Physical Layer Signaling Design for TDD eIMTA," 3GPP TSG RAN WG1 #75, R1-135013, Nov. 2013, 5 pages.

Fujitsu, "Signaling Options for TDD UL-DL Reconfiguration," 3GPP TSG RAN WG1 #75, R1-135128, Nov. 2013, 4 pages.

LG Electronics, "Remaining Details of Signalling for TDD eIMTA," 3GPP TSG RAN WG1 #75, R1-135454, Nov. 2013, 5 pages.

PCT International Application No. PCT/KR2014/012527, Written Opinion of the International Searching Authority dated Oct. 4, 2015, 21 pages.

Korean Intellectual Property Office Application No. 10-2016-7015389, Notice of Allowance dated Jul. 20, 2021, 2 pages.

Sharp, "On UE behavior in fallback mode for eIMTA", R1-135728, 3GPP TSG RAN WG1 Meeting #75, Nov. 2013, 5 pages.

United States Patent and Trademark Office U.S. Appl. No. 16/746,147, Office Action dated Mar. 17, 2021, 7 pages.

United States Patent and Trademark Office U.S. Appl. No. 16/746,147, Notice of Allowance dated May 17, 2021, 9 pages.

United States Patent and Trademark Office U.S. Appl. No. 15/106,267, Office Action dated Oct. 6, 2017, 13 pages.

United States Patent and Trademark Office U.S. Appl. No. 15/106,267, Notice of Allowance dated Jun. 19, 2018, 11 pages.

United States Patent and Trademark Office U.S. Appl. No. 15/106,267, Office Action dated Oct. 18, 2018, 8 pages.

United States Patent and Trademark Office U.S. Appl. No. 15/106,267, Final Office Action dated Jul. 8, 2019, 12 pages.

United States Patent and Trademark Office U.S. Appl. No. 15/106,267, Notice of Allowance dated Oct. 21, 2019, 5 pages.

\* cited by examiner

FIG. 2
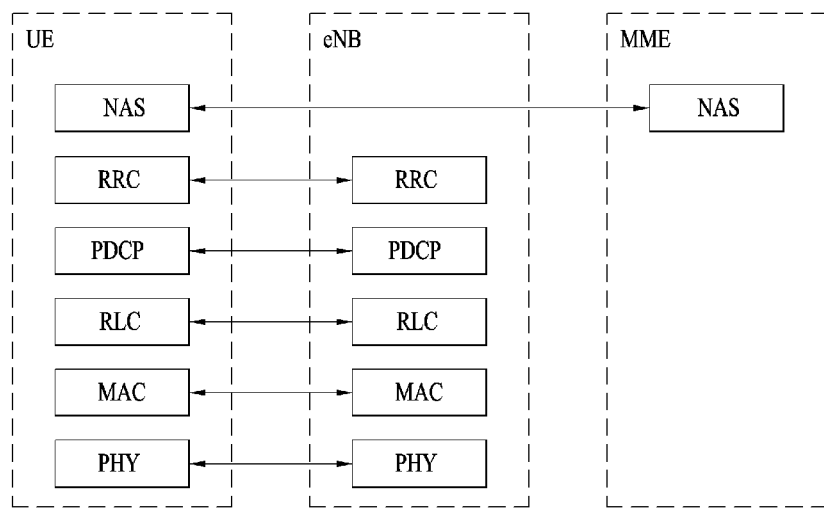
(a) Control-plane protocol stack
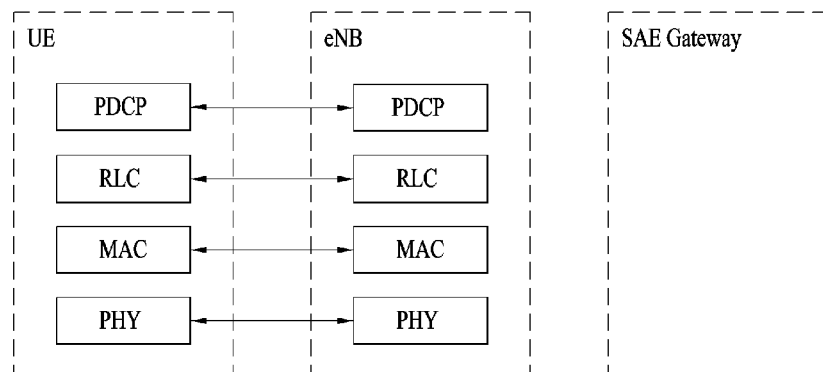
(b) User-plane protocol stack FIG. 7
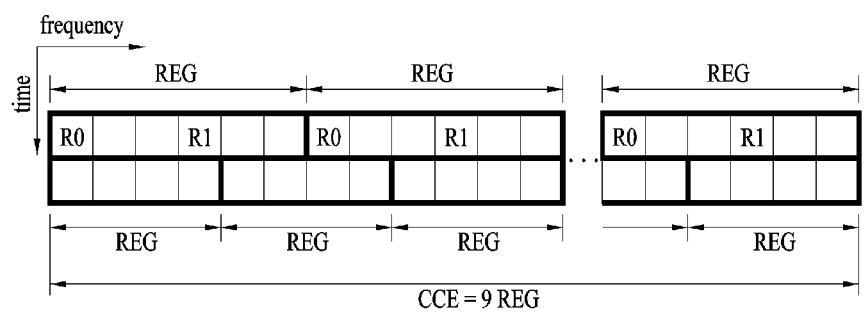
(a) 1 TX or 2 TX
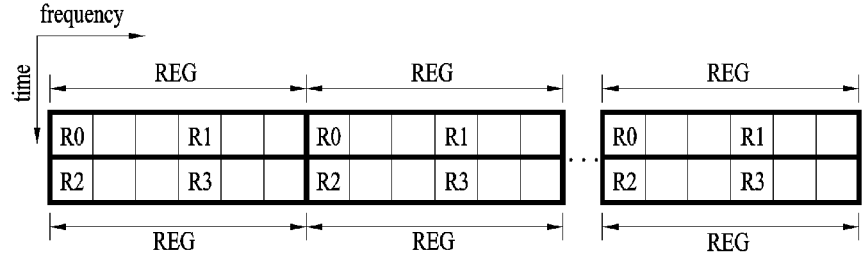
(b) 4 TX Case of using UL SF by changing usage of UL SF into DL usage

METHOD FOR TRANSMITTING AND RECEIVING SIGNAL BY TERMINAL IN WIRELESS COMMUNICATION SYSTEM AND APPARATUS THEREFOR

CROSS-REFERENCE TO RELATED APPLICATIONS

This application is a continuation of U.S. patent application Ser. No. 16/746,147, filed on Jan. 17, 2020, which is a continuation of U.S. patent application Ser. No. 15/106,267, filed on Jun. 17, 2016, now U.S. Pat. No. 10,582,492, which is the National Stage filing under 35 U.S.C. 371 of International Application No. PCT/KR2014/012527, filed on Dec. 18, 2014, which claims the benefit of U.S. Provisional Application No. 61/917,930, filed on Dec. 18, 2013, the contents of which are all hereby incorporated by reference herein in their entirety.

TECHNICAL FIELD

The present invention relates to a wireless communication system, and more particularly, to a method of transmitting and receiving a signal of a user equipment in a wireless communication system and apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

A terminal periodically and/or aperiodically reports information on a current channel state to a base station to assist efficient management of a wireless communication system of the base station. Since the information on the channel state reported to the base station is able to include results calculated in consideration of various situations, a more efficient reporting method is required.

DISCLOSURE OF THE INVENTION

Technical Task

Based on the above-mentioned discussions, the technical task of the present invention is to propose a method of transmitting and receiving a signal of a user equipment in a wireless communication system and apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

To achieve these objects and other advantages and in accordance with the purpose of the invention, as embodied and broadly described herein, a method of transmitting and receiving a signal in a user equipment of a wireless communication system supportive of reconfiguration of radio resource according to one embodiment of the present invention may include the step of monitoring a radio resource reconfiguration control information on a multitude of subframes in monitoring periodicity set for radio resource reconfiguration, wherein a first UL-DL configuration according to the radio resource reconfiguration control information is valid only if detected equally from a multitude of the subframes and wherein a multitude of the subframes comprise subframes configured to monitor the radio resource reconfiguration control information of the user equipment.

The method may further include the step of if the first UL-DL configuration is not valid, performing fallback for transceiving the signal with a base station according to a second UL-DL configuration on SIB (system information block).

The method may further include the step of if the first UL-DL configuration is valid, transceiving the signal with the base station on a time interval having the first UL-DL configuration applied thereto.

The radio resource reconfiguration information may be transmitted through common search space (CSS) on downlink control channel (physical downlink control channel (PDCCH)). The first UL-DL configuration may be indicated using an indicator included in the radio resource reconfiguration control information. The radio resource reconfiguration control information may include a multitude of indicators and wherein the first UL-DL configuration is indicated according to an indicator corresponding to a field designated to be monitored by the user equipment among a multitude of the indicators.

And, a multitude of the subframes may be indicated by an upper layer.

In another aspect of the present invention, as embodied and broadly described herein, in transceiving a signal in a wireless communication system supportive of reconfiguration of radio resource, a user equipment according to another embodiment of the present invention may include a radio frequency unit and a processor configured to monitor a radio resource reconfiguration control information on a multitude of subframes in monitoring periodicity set for radio resource reconfiguration, wherein a first UL-DL configuration according to the radio resource reconfiguration control information is valid only if detected equally from a multitude of the subframes and wherein a multitude of the subframes comprise subframes configured to monitor the radio resource reconfiguration control information of the user equipment.

Advantageous Effects

According to the present invention, signal transmission and reception can be efficiently performed in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 shows structures of a control plane and a user plane of a radio interface protocol between a user equipment and E-UTRAN based on 3GPP radio access network specifications.

FIG. 7 shows a resource unit used in configuring a downlink control channel in LTE system.

BEST MODE FOR INVENTION

Figure 1:
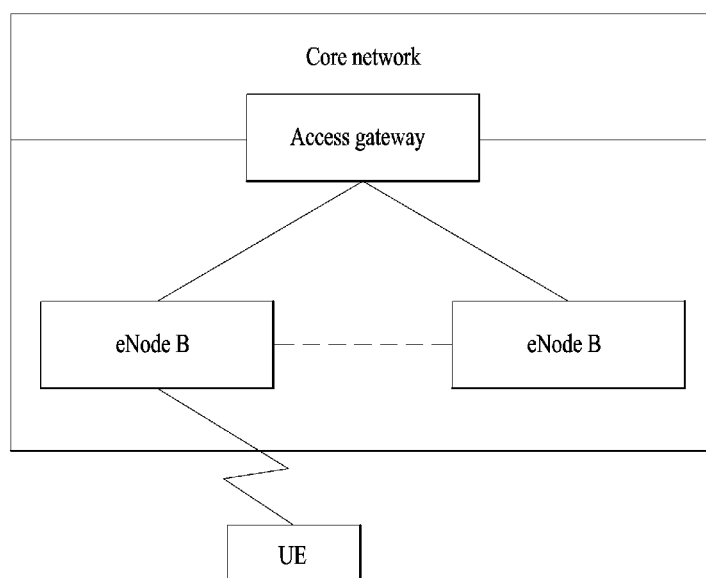
FIG. 1 shows a structure of E-UMTS network as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
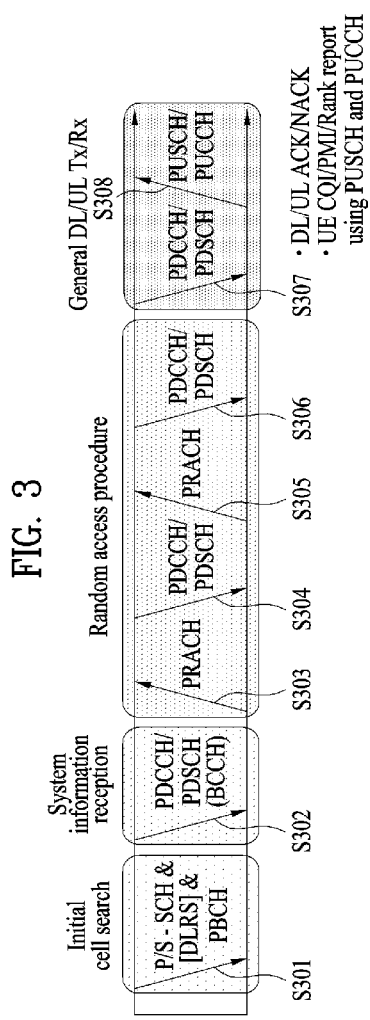
FIG. 3 shows physical channels used in 3GPP LTE system and a general signal transmitting method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
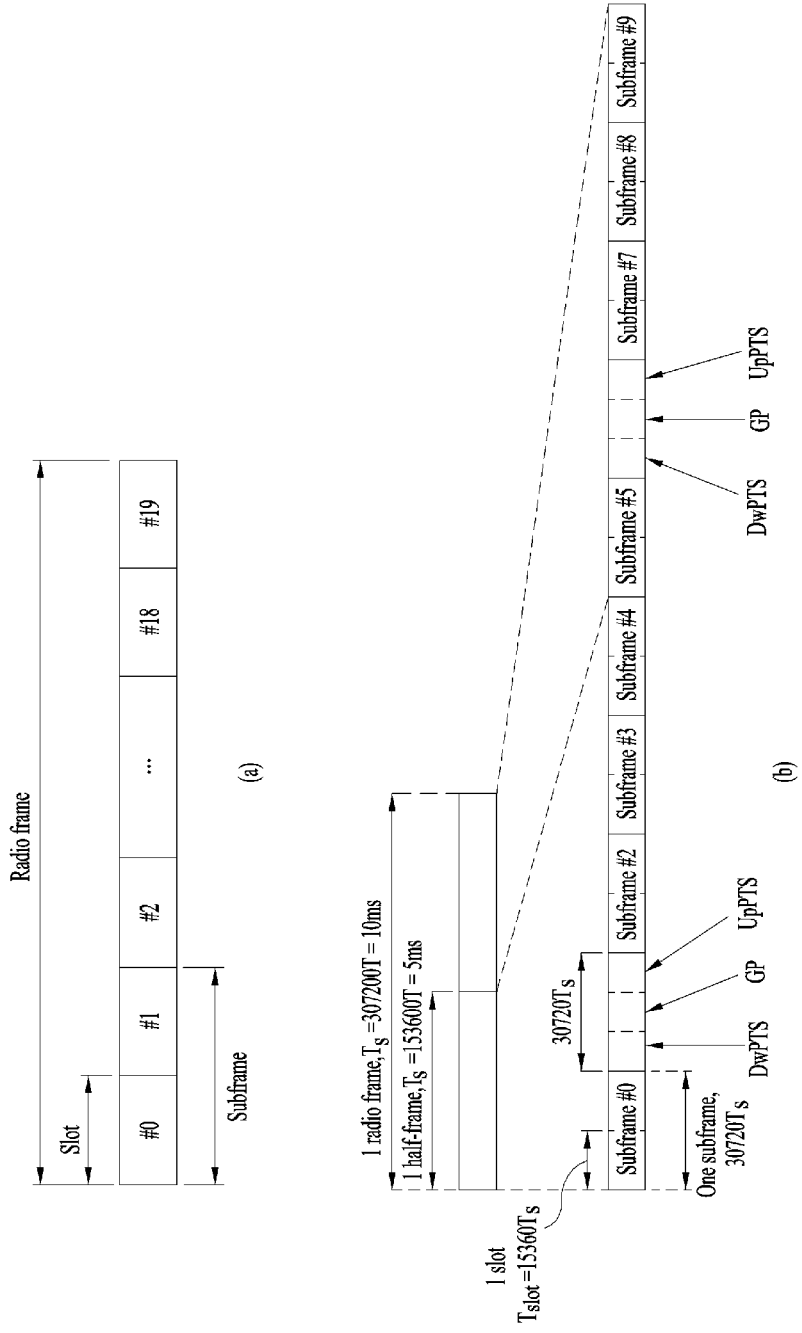
FIG. 4 shows a configuration of a radio frame used in LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $$T_s = 1/(15000 \times 2048),$$

and the other region is configured for the guard period.

TABLE 1

| | | Normal cyclic prefix in downlink | | | Extended cyclic prefix in downlink | |
|---|---|---|---|---|---|---|
| | | | UpPTS | | | UpPTS |
| | | Normal | Extended | | Normal cyclic | Extended cyclic |
| Special subframe configuration | DwPTS | cyclic prefix in uplink | cyclic prefix in uplink | DwPTS | prefix in uplink | prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 24080 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
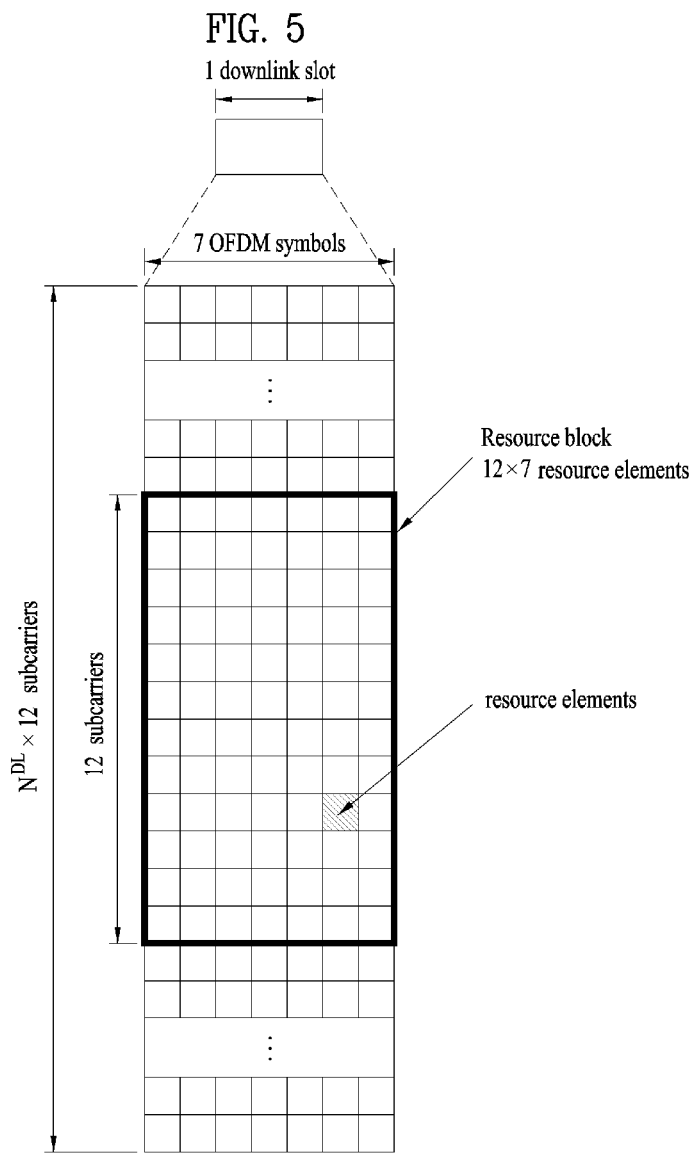
FIG. 5 shows a resource grid for a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $$N_{symb}^{DL} \times N_{sc}^{RB}$$

number of resource elements. The number $N_{RB}^{DL}$ of resource blocks included in the downlink slot depends on a downlink transmission bandwidth configured in the cell.

Figure 6:
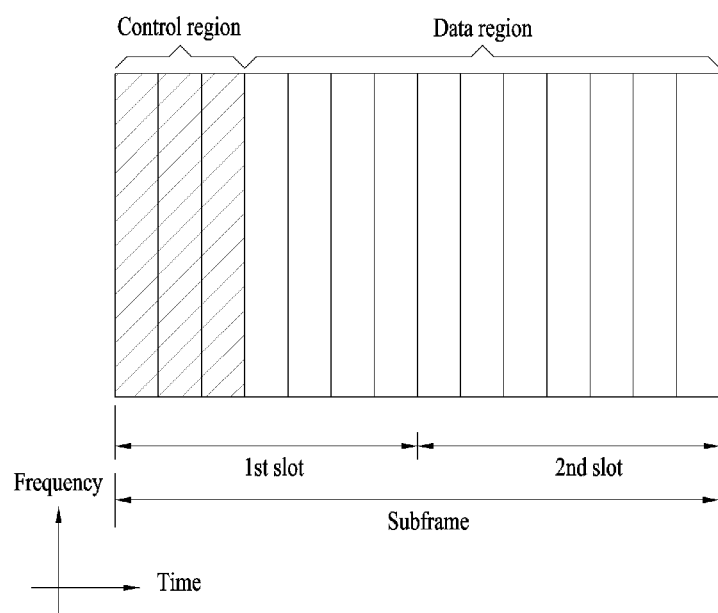
FIG. 6 shows a configuration of a downlink subframe.

FIG. 6 shows a configuration of a downlink subframe.

Referring to FIG. 6, maximum 3 (4) OFDM symbols situated in a head part of a first slot of a subframe correspond to a control region to which control channels are assigned. The rest of OFDM symbols correspond to a data region to which PDSCH (physical downlink shared channel) is assigned. Examples of DL (downlink) control channels used by 3GPP LTE may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols used for a transmission of a control channel within the subframe. The PHICH carries HARQ ACK/NACK (acknowledgement/negative-acknowledgement) signal in response to UL (uplink) transmission.

Control information carried on PDCCH may be called a downlink control information (hereinafter abbreviated DCI). The DCI may include a resource allocation information for a user equipment or a user equipment group and other control informations. For instance, the DCI includes UL/DL scheduling information, UL transmission (Tx) power control command, power control command, and the like.

PDCCH carries a transmission format and resource allocation of DL-SCH (downlink shared channel), a resource allocation information on UL-SCH (uplink shared channel), a paging information on PCH (paging channel), a system information on DL-SCH, a resource allocation information such as a random access response transmitted on PDSCH, a transmission power control command for an individual user equipment in a random user equipment (UE) group, an activation of VoIP (voice over IP) and the like. A plurality of PDCCHs can be transmitted within a control region. A user equipment is able to monitor a plurality of the PDCCHs. PDCCH is transmitted on a single CCE (control channel element) or an aggregation of a plurality of consecutive CCEs. The CCE is a logical assignment unit used to provide PDCCH of a prescribed coding rate in accordance with a state of a radio channel. The CCE corresponds to a plurality of REGs (resource element group). A format of PDCCH and the bit number of available PDCCH are determined in accordance with a correlation between the number of CCEs and a coding rate provided by CCE. A base station determined a PDCCH format depending on a DCI which is to be transmitted to a user equipment and attaches a CRC (cyclic redundancy check) to a control information. The CRC is masked with a unique identifier (RNTI (radio network temporary identifier) in accordance with an owner or usage of PDCCH. For instance, if PDCCH is provided for a specific user equipment, an identifier (e.g., C-RNTI (cell-RNTI)) of the corresponding user equipment is masked on a CRC. If PDCCH is provided for a paging message, a paging identifier (e.g., P-RNTI (paging-RNTI) can be masked on a CRC. If PDCCH is provided for a system information (more particularly, system information block (SIC)), SI-RNTI (system information-RNTI) can be masked on a CRC. If PDCCH is provided for a random access response, RA-RNTI (random access-RNTI) can be masked on a CRC.

FIG. 7 shows a resource unit used in configuring a downlink control channel in LTE system. In particular, FIG. 7(a) shows a case that the number of transmitting antenna(s) of a base station is 1 or 2. And, FIG. 7(b) shows a case that the number of transmitting antennas of a base station is 4. The cases differ from each other in RS (reference signal) pattern but have the same method of configuring a resource unit related to a control channel.

Referring to FIG. 7, a basic resource unit of a control channel is REG. The REG includes 4 neighboring resource elements (REs) except RS. The REG is indicated by a bold line in the drawing. PCFICH and PHICH include 4 REGs and 3 REGs, respectively. PDCCH is configured by CCE (control channel elements) unit and one CCE includes 9 REGs.

A user equipment is set to check $M^{(L)}$ (≥L) CCEs, which are contiguous to each other or arranged by specific rules, in order to check whether PDCCH configured with L CCEs is transmitted to the corresponding user equipment. The L value, which should be considered by the user equipment for PDCCH reception, may become a plural number. CCE sets, which should be checked by the user equipment for the PDCCH reception, are called a search space. For instance, LTE system defines a search space as Table 3.

TABLE 3

| | Search space $S_k^{(L)}$ | | Number of PDCCH candidates $M^{(L)}$ |
|---|---|---|---|
| Type | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In Table 3, CCE aggregation level L indicates the number of CCEs configuring PDCCH, $S_k^{(L)}$ indicates a search space of the CCE aggregation level L, and $M^{(L)}$ indicates the number of PDCCH candidates supposed to be monitored in the search space of the aggregation level L.

The search space may be categorized into a UE-specific search space accessible by a specific user equipment only and a common search space accessible by all user equipments in a cell. A user equipment monitors a common search space having a CCE aggregation level set to 4 or 8 and a UE-specific search space having a CCE aggregation level set to 1, 2, 4 or 8. And, the common search space and the UE-specific search space may overlap each other.

Moreover, a position of a $1^{st}$ CCE (i.e., CCE having a smallest index) in PDCCH search space given to a random user equipment for each CCE aggregation level value may vary in each subframe according to a user equipment. This may be called a PDCCH search space hashing.

The CCE may be dispersed on a system band. In particular, a plurality of CCEs logically contiguous to each other can be inputted to an interleaver. And, the interleaver performs a function of mixing a plurality of the inputted CCEs. Hence, frequency/time resources configuring a single CCE are physically scattered and distributed on a whole frequency/time domain within a control region of a subframe. Eventually, although a control channel is configured by CCE units, as interleaving is performed by REG units, it is able to maximize frequency diversity and interference randomization gain.

Figure 8:
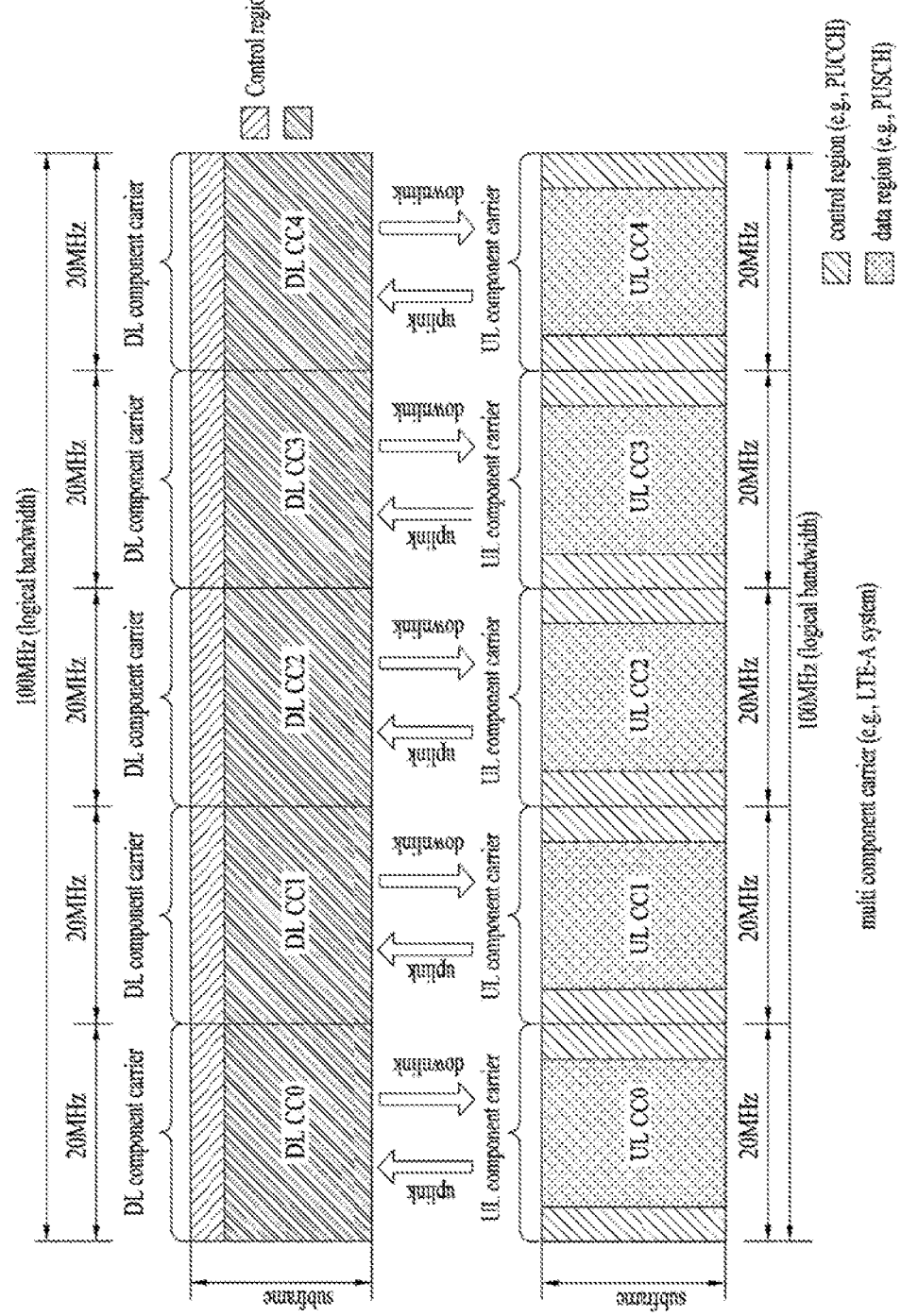
FIG. 8 shows one example of a carrier aggregation (CA) communication system.

FIG. 8 shows one example of a carrier aggregation (CA) communication system.

Referring to FIG. 8, a plurality of UL/DL CCs (uplink/downlink component carriers) are aggregated so as to support a wider UL/DL bandwidth. The terminology 'component carrier (CC)' can be substituted with another equivalent terminology (e.g., carrier, cell, etc.). The respective CCs may be adjacent or non-adjacent to each other in a frequency domain. A bandwidth of each of the component carriers may be determined independently. It is possible to configure asymmetric carrier aggregation in which the number of UL CCs is different from that of DL CCs. Meanwhile, a control information may be set to be transceived through a specific CC only. Such a specific CC may be named a primary CC (or an anchor CC), while other CCs may be named secondary CCs.

In case of applying a cross-carrier scheduling (or a cross-CC scheduling), a PDCCH for a DL assignment may be transmitted on DL CC #0 and a corresponding PDSCH may be transmitted on DL CC #2. For the cross-CC scheduling, it may be able to consider an introduction of a carrier indicator field (CIF). A presence or non-presence of a CIF in PDCCH can be set by an upper layer signaling (e.g., RRC signaling) in a semi-static manner of a UE-specific (or UE group-specific) manner. A baseline of PDCCH transmission is summarized as follows.

CIF disabled: PDCCH on DL CC allocates PDSCH resource on the same DL CC or PUSCH resource on a linked UL CC.

No CIF

Same as LTE PDCCH structure (same coding, same CCE-based resource mapping) and DCI format CIF enabled: PDCCH on DL CC can allocate PDSCH or PUSCH resource on a specific DL/UL CC among a plurality of aggregated DL/UL CCs using CIF.

Extended LTE DCI format having CIF

CIF (enabled) corresponds to a fixed x-bit field (e.g., x=3)

CIF (enabled) location is fixed irrespective of DCI format size

Reuse LTE PDCCH structure (same coding, same CC-based resource mapping)

If CIF is present, a base station is able to assign a PDCCH monitoring DL CC set to lower BD complexity of a user equipment side. The PDCCH monitoring DL CC set includes at least one DL CC as apportion of full DL CCs and a user equipment performs detection/decoding of PDCCH on the corresponding DL CC only. In particular, in case that a base station schedules PDSCH/PUSCH for a user equipment, the PDCCH is transmitted on a PDCCH monitoring DL CC set only. The PDCCH monitoring DL CC set can be configured in a UE-specific manner, a UE-group-specific manner, or a cell-specific manner. The terminology 'PDCCH monitoring DL CC set' can be substituted with such an equivalent terminology as a monitoring carrier, a monitoring cell or the like. Moreover, a CC aggregated for a user equipment can be substituted with such an equivalent terminology as a serving CC, a serving carrier, a serving cell or the like.

Figure 9:
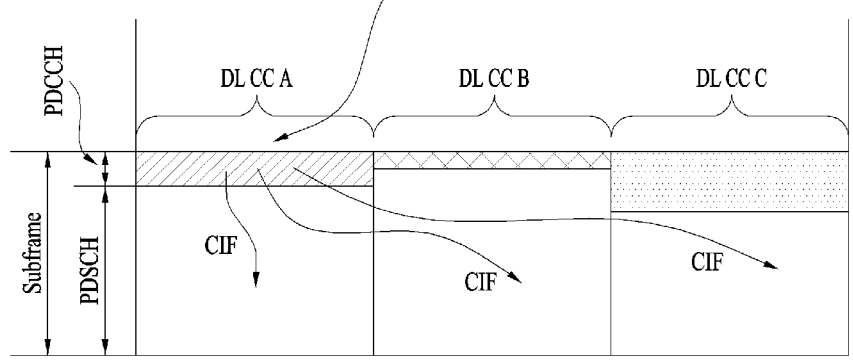
FIG. 9 shows one example of a scheduling in case of aggregating a plurality of carriers.

FIG. 9 shows one example of a scheduling in case of aggregating a plurality of carriers. Assume that 3 DL CCs are aggregated. Assume that DL CC A is configured as a PDCCH monitoring DL CC. DL CC A~C may be called a serving CC, a serving carrier, a serving cell, or the like. If a CIF is disabled, each DL CC can transmit only a PDCCH for scheduling its PDSCH without CIF in accordance with LTE PDCCH configuration. On the other hand, if a CIF is enabled by a UE-specific (or, UE-group-specific, cell-specific) upper layer signaling, DL CC A (i.e., a monitoring DL CC) can transmit not only a PDCCH for scheduling a PDSCH of DL CC A but also a PDCCH for scheduling a PDSCH of another CC using the CIF. In this case, a PDCCH is not transmitted on DL CC B/C failing to be set as a PDCCH monitoring DL CC. Hence, the DL CC A (i.e., the monitoring DL CC) should include a PDCCH search space related to the DL CC A, a PDCCH search space related to the DL CC B and a PDCCH search space related to the DL CC C all. In the present specification, assume that a PDCCH search space is defined for each carrier.

As mentioned in the foregoing description, LTE-A currently considers using a CIF within PDCCH for cross-CC scheduling. A presence or non-presence of a use of a CIF (i.e., a support of a cross-CC scheduling mode or a non-cross-CC scheduling mode) and an inter-mode switching may be configured semi-statically/UE-specifically through an RRC signaling. After a user equipment has gone through the corresponding RRC signaling, the user equipment is able to recognize whether a CIF is used within a PDCCH that will be scheduled for the corresponding user equipment.

Figure 10:
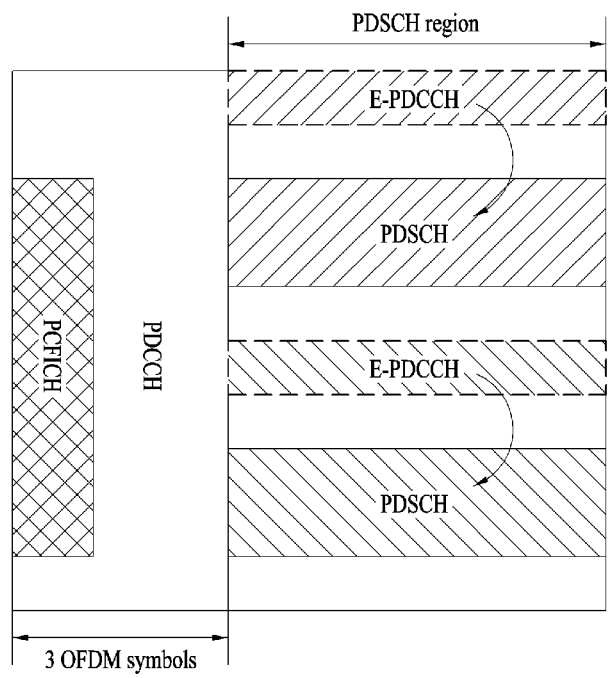
FIG. 10 shows one example of EPDCCH and PDSCH scheduled by EPDCCH.

FIG. 10 shows one example of EPDCCH and PDSCH scheduled by EPDCCH.

Referring to FIG. 10, EPDCCH is able to define and use a portion of a PDSCH region for transmitting data in general. And, a user equipment should perform a blind decoding process for detecting a presence or non-presence of its EPDCCH. Although the EPDCCH performs the same scheduling operation (i.e., PDSCH/PUSCH control) of an existing legacy PDCCH, if the number of user equipments currently accessing such a node as RRH increases, a great number of EPDCCHs are assigned within a PRSCH region to increase a count of blind decodings the user equipment should perform. Hence, it is disadvantageous in that complexity may increase.

In the following description, CoMP (cooperative multi-point transmission/reception) is described.

Since LTE-A, systems intend to employ a scheme of raising performance of system by enabling cooperation among several cells. Such a scheme is called cooperative multipoint transmission/reception (CoMP). The CoMP means a scheme that at least two base stations, access points or cells communicate with a user equipment cooperatively in order to perform communication between a specific user equipment and a base station, an access point or a cell more smoothly. In the present invention, a base station, an access point or a cell may be used for the same meaning.

Generally, in a multi-cell environment having a frequency reuse factor set to 1, the performance and average sector throughput of a user equipment located at the cell edge may be lowered due to inter-cell interference (ICI). In order to reduce the ICI, a conventional LTE system has employed a method of providing an appropriate throughput performance to a user equipment located at a cell edge in an environment restricted by interference using a simple passive scheme such as FFR (fractional frequency reuse) via UE-specific power control. Yet, reducing the ICI or reusing the ICI as a signal desired by a user equipment may be more preferable than lowering a frequency resource use per cell. To achieve this object, CoMP transmission schemes may be applicable.

Figure 11:
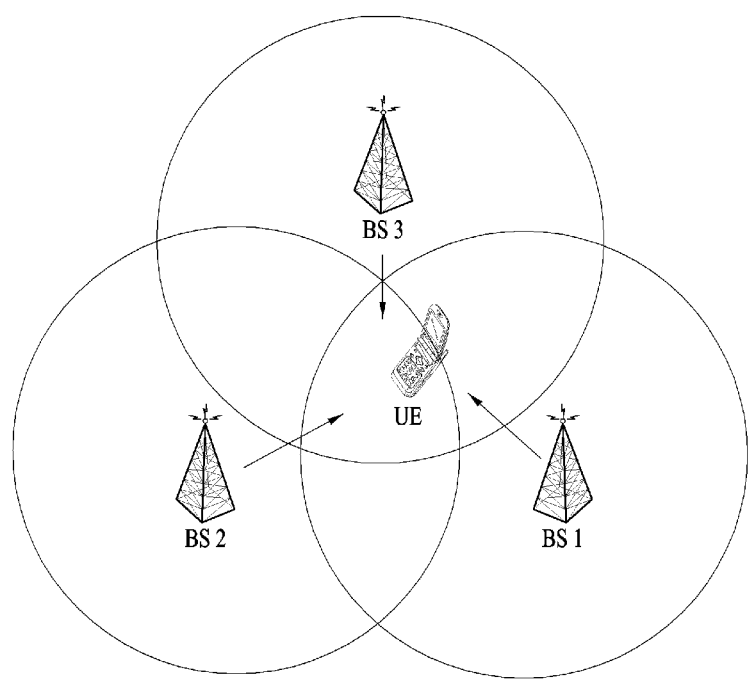
FIG. 11 shows one example of performing CoMP.

FIG. 11 shows one example of performing CoMP. referring to FIG. 11, a wireless communication system includes a plurality of base stations BS1, BS2 and BS3 configured to perform CoMP and a user equipment. A plurality of the base stations BS1, BS2 and BS3 can transmit data to the user equipment efficiently by cooperating with each other. CoMP can be classified into two types depending on whether data is transmitted from each base station configured to perform CoMP as follows.

Joint Processing (CoMP Joint Processing: CoMP-JP)
Cooperative Scheduling/Beamforming (CoMP-CS/CB, CoMP Cooperative Scheduling: CoMP-CS)

In case of CoMP-JP, data toward a single user equipment are simultaneously transmitted to the user equipment from the respective base stations performing CoMP and the user equipment improves reception performance by combining signals from the respective base stations together. In particular, CoMP-JP scheme can use data at each point (e.g., base station) of CoMP cooperation unit. And, the CoMP cooperation unit may mean a set of base stations used for the cooperative transmission scheme. The JP scheme may be classified into a joint transmission scheme and a dynamic cell selection scheme.

The joint transmission scheme means a scheme of transmitting PDSCH from a plurality of points (portion or all of CoMP cooperation unit) at a time. In particular, data transmitted to a single user equipment may be simultaneously from a plurality of transmission points. According to the joint transmission scheme, a quality of a coherently or non-coherently received signal can be improved and interference on another user equipment can be actively eliminated.

The dynamic cell selection scheme means the scheme of transmitting PDSCH from one point (of CoMP cooperation unit) at a time. In particular, data transmitted to a single user equipment at a specific timing point is transmitted from one point, the rest of points in the cooperation unit at that timing point do not perform data transmission to the corresponding user equipment, and a point transmitting data to the corresponding user equipment may be dynamically selected.

On the other hand, in case of CoMP-CS, data to one user equipment is transmitted through one base station at a random timing point and scheduling or beamforming is performed to minimize interference caused by another base station. In particular, according to the CS/CB scheme, CoMP cooperation units can cooperatively perform beamforming of data transmission to a single user equipment. In this case, although data is transmitted from a serving cell only, user scheduling/beamforming may be determined by the coordination of cells of the corresponding CoMP cooperation unit.

Meanwhile, in case of uplink, coordinated multi-point reception means that a signal transmitted by coordination of a plurality of points geographically spaced apart from each other is received. CoMP schemes applicable to a case of uplink may be classified into joint reception (JR) and coordinated scheduling/coordinated beamforming (CS/CB).

The JR scheme means that a signal transmitted on PUSCH is received by a plurality of reception points. And, the CS/CB scheme means that user scheduling/beamforming is determined by coordination of cells of CoMP cooperation unit despite that PUSCH is received by one point only.

Interference among multiple cells is described as follows.

Like a case that two base stations (e.g., base station #1 and base station #2) are disposed adjacently, if coverages of the two base stations overlap with each other in part, a strong DL signal from one base station may cause interference to a user equipment served by the other base station. Thus, in case that inter-cell interference occurs, it is able to reduce the inter-cell interference through an inter-cell cooperation signal scheme between two base stations. In various embodiments of the present invention described in the following, assume a case that signal transmission and reception between two base stations causing interference to each other is performed smoothly. For instance, as wired/wireless link (e.g., backhaul link, Un interface, etc.) having a good transmission condition (e.g., transmission bandwidth, time delay, etc.) exists between two base stations, assume a case that reliability on transmission and reception of a cooperative signal between base stations is high. Moreover, it is able to assume a case that time synchronization between two base stations coincides (e.g., edges of DL subframes of two base stations exchanging interference with each other are aligned) or a case that offset of subframe boundaries between two base stations is recognized clearly and mutually.

Referring now to FIG. 11, the base station #1 (BS #1) may include a macro base station servicing a wide area with high transmission power, while the base station #2 (BS #2) may include a micro base station (e.g., pico base station) servicing a small area with low transmission power. When a user equipment (UE) served by the base station #2 by being located in a cell edge area of the base station #2 receives strong interference from the base station #2, as shown in FIG. 11, it may be difficult to perform communication effectively without appropriate inter-cell cooperation.

Particularly, in case that the base station #1 (i.e., macro base station) intends to disperse load for providing a service by connecting many user equipments to the base station #2 (i.e., micro base station) having low power, it is highly probable that the above-mentioned situation of inter-cell interference occurs. For instance, in case that a user equipment intends to select a serving base station, it is able to calculate and compare a reception power of a DL signal from each base station in a manner of adding a prescribed coordination value (e.g., bias value) to a reception power from a micro base station but not adding a coordination value to a reception power from a macro base station. As a result, the user equipment can select a base station providing a highest DL reception power as a serving base station. Accordingly, more user equipments can be connected to the micro base station. Regarding DL signal strength actually received by a user equipment, despite that a signal from a macro base station is much stronger, a micro base station can be selected as a serving base station. And, the user equipment connected to the micro base station can experience strong interference from the macro base station. In this case, user equipments located on the edge of the micro base station may have difficulty in performing correct operations due to the strong interference from the macro base station if separate inter-cell cooperation is not provided.

When inter-cell interference exists, in order to perform effective operation, appropriate cooperation should be performed between two base stations exchanging the inter-cell interference with each other. And, a signal for enabling such cooperative operation can be transceived in a link between the two base stations. In doing so, if inter-cell interference occurs between a macro base station and a micro base station, the macro base station controls inter-cell cooperation operation and the micro base station can perform an appropriate operation according to a cooperation signal indicated by the macro base station.

The above inter-cell interference occurrence situation is just exemplary. And, it is apparent that embodiments described in the present invention are exactly applicable to cases (e.g., case of occurrence of inter-cell interference between HeNB of CSG and macro base station of OSG, case of interference caused to macro base station by micro base station, case of presence of inter-cell interference between micro base station and macro base station, etc.) of occurrence of inter-cell interference in situation different from the above.

Figure 12:
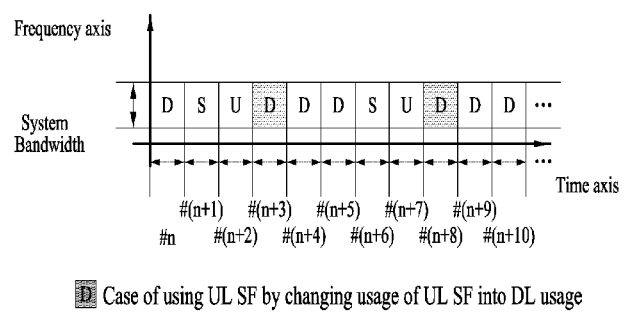
FIG. 12 shows a case that usage of radio resource is dynamically changed in TDD system environment.

FIG. 12 shows a case that a specific cell changes to use a portion of an existing UL resource (i.e., UL SF) for the purpose of DL communication if a quantity of DL load of a system increases in TDD system environment.

In FIG. 12, UL-DL configuration through SIB is assumed as UL-DL #1 (i.e., DSUUDDSUUD). And, FIG. 12 shows a case that existing UL SF #(n+3) and UL SF #(n+8) are used in a manner of changing usages of existing UL SF #(n+3) and UL SF #(n+8) for DL communication through a pre-defined signal (e.g., physical/upper layer signal, system information signal, etc.).

1. UL-DL Configuration Application According to the Present Invention

The present invention proposes a method for a user equipment (e.g., eIMTA UE) having received a multitude of radio resource usage (re)change messages (UL-DL Reconfiguration DCI or radio resource usage reconfiguration control information) in a pre-defined specific time interval (e.g., Monitoring Window for UL-DL Reconfiguration DCI, or Reception Window for UL-DL Reconfiguration DCI)) to efficiently determine/select UL-DL configuration actually applied to a linked radio resource usage (re)change message application duration (Validation Widow of Received UL-DL Reconfiguration DCI, or Application Widow of Received UL-DL Reconfiguration DCI). In the following description of the present invention, information for changing/reconfiguring the preset usage of radio resource is named a usage reconfiguration message (Reconfiguration DCI), which is for clarity and convenience of the description of the present invention only. In some cases, although the information is named radio resource usage reconfiguration control information, it may be interpreted as the same information in the application of the present invention.

For clarity of the following description, the present invention is described based on 3GPP LTE system. Yet, the scope of the present invention applicable systems can be extended to other systems as well as to the 3GPP LTE system.

Embodiments of the present invention are extensively applicable to a case that resource on specific cell or specific component carrier (CC) is dynamically changed according to load state of system in CA (carrier aggregation) applied environment.

And, embodiments of the present invention are extensively applicable to a case that usage of radio resource is dynamically changed in TDD system, FDD system, or TDD/FDD merged system.

For clarity of the following description of the present invention, assume a situation that each cell dynamically changes a usage of an existing radio resource according to system load state of its own.

1-1. Configuration of Radio Resource Usage (Re)configuration Message

Prior to the detailed description of the present invention, a radio resource usage (re)configuration message (hereinafter named UL-DL reconfiguration DCI) can be configured and transmitted/applied based on the rules described in the following. In this case, 'T' may be interpreted as update periodicity of UL-DL reconfiguration DCI (or, update periodicity of UL-DL configuration.

First of all, the configuration of a radio resource usage (re)configuration message (UL-DL reconfiguration DCI) for the present invention is described. New RNTI for an explicit radio resource usage (re)configuration message (UL-DL reconfiguration DCI) can be defined. And, the radio resource usage (re)configuration message (UL-DL reconfiguration DCI) is transmitted with at least 3 bits to explicitly indicate one of 7 UL-DL configurations. In this case, the radio resource usage (re)configuration message (UL-DL reconfiguration DCI) can be transmitted on PDCCH common search space of Pcell.

If a user equipment uses a multitude of eIMTA-enabled cells, the user equipment can receive indication of radio resource usage (re)configuration message (UL-DL reconfiguration DCI) for a multitude of the eIMTA-enabled cells using DCI transmitted on PDCCH CSS of Pcell. In this case, if DCI is transmitted on PDCCH CSS of Pcell, a multitude of indicators (3 bits per indicator) for a multitude of the eIMTA-enabled cells may be included in one explicit radio resource usage (re)configuration message (UL-DL reconfiguration DCI) for a multitude of the eIMTA-enabled cells.

Furthermore, a group common DCI for a user equipment can be transmitted on a common search space of Pcell only.

1-2. Transmission/Reception and Application of Radio Resource Usage (Re)configuration Message (UL-DL Reconfiguration DCI)

A user equipment is set to monitor radio resource usage (re)configuration message on subframes that meet '$(10 \cdot n_f + n-k) \bmod T = 0$'. In this case, n is a subframe number in a radio frame and $n_f$ is a radio frame number. T and k are defined in Table 4.

UL-DL configuration indicated by a radio resource usage (re)configuration message received in a subframe of a radio fram $\{m \cdot T/10, m \cdot T/10+1, \ldots, (m+1) \cdot T/10-1\}$ is valid at $\{m \cdot T/10, m \cdot T/10+1, \ldots, (m+1) \cdot T/10-1\}$ (hereinafter named "Current") or $\{(m+1) \cdot T/10, (m+1) \cdot T/10+1, \ldots, (m+2) \cdot T/10-1\}$ (hereinafter named "Next") according to Table 4. Moreover, it is not necessary for the user equipment to wake up to monitor a radio resource usage (re)configuration message in DRX OFF state. In this case, 'm; is an arbitrary integer (e.g., positive integer including 0, positive integer, etc.).

Operations of a user equipment related to a radio resource usage (re)configuration message are defined as follows.

Operation 1: If a user equipment is set to monitor a radio resource usage (re)configuration message on a multitude of subframes for a radio frame $\{m \cdot T/10, m \cdot T/10+1, \ldots, (m+1) \cdot T/10-1\}$, if at least one radio resource usage (re)configuration message is successfully decoded on the radio frame $\{m \cdot T/10, m \cdot T/10+1, \ldots, (m+1) \cdot T/10-1\}$, the user equipment can skip the decoding of the radio resource usage (re)configuration message on the radio frame $\{m \cdot T/10, m \cdot T/10 +1, \ldots, (m+1) \cdot T/10 -1\}$.

Operation 2: If a user equipment is set to monitor a radio resource usage (re)configuration message on a multitude of subframes for a radio frame $\{m \cdot T/10, m \cdot T/10 +1, \ldots, (m+1) \cdot T/10-1\}$, the user equipment can regard it as the same UL-DL configuration indicated on the radio resource usage (re)configuration message on the radio frame $\{m \cdot T/10, m \cdot T/10+1, \ldots, (m+1) \cdot T/10-1\}$.

TABLE 4

| Periodicity T (ms) | Offset k (ms) (0 ≤ k < T) | Valid duration |
|---|---|---|
| 10 | A X-bit bitmap to indicate a set of SIB-1 DL/S subframe. Starting from the MSB to LSB, the bitmap corresponds to subframe #{[Xa, Xb, Xc, . . . ]}. The bit "1" indicates that UE shall monitor the reconfiguration DCI in the corresponding subframe, and the bit "0" indicates otherwise. | "Current" for the reconfiguration DCI in subframe #0 "Next" for the reconfiguration DCI in the SIB1 DL/S subframes other than subframe #0 |
| 20 | A Y-bit bitmap to indicate a set of SIB-1 DL/S subframe. Starting from the MSB to LSB, the bitmap corresponds to subframe #{[Ya, Yb, Yc, . . . ]}. The bit "1" indicates that UE shall monitor the reconfiguration DCI in the corresponding subframe, and the bit "0" indicates otherwise. | ["Current" for the reconfiguration DCI in subframe #0 in the first radio frame in the window, if supported by the Y-bit bitmap] "Next" for the reconfiguration DCI in the SIB1 DL/S subframes other than subframe #0 in the first radio frame in the window |
| 40 | A Z-bit bitmap to indicate a set of SIB-1 DL/S subframe. Starting from the MSB to LSB, the bitmap corresponds to subframe #{[Za, Zb, Zc, . . . ]}. The bit "1" indicates that UE shall monitor the reconfiguration DCI in the corresponding subframe, and the bit "0" indicates otherwise. | ["Current" for the reconfiguration DCI in subframe #0 in the first radio frame in the window, if supported by the Z-bit bitmap] "Next" for the reconfiguration DCI in the SIB1 DL/S subframes other than subframe #0 in the first radio frame in the window |
| 80 | A Q-bit bitmap to indicate a set of SIB-1 DL/S subframe. Starting from the MSB to LSB, the bitmap corresponds to subframe #{[Qa, Qb, Qc, . . . ]}. The bit "1" indicates that UE shall monitor the reconfiguration DCI in the corresponding subframe, and the bit "0" indicates otherwise. | ["Current" for the reconfiguration DCI in subframe #0 in the first radio frame in the window, if supported by the Q-bit bitmap] "Next" for the reconfiguration DCI in the SIB1 DL/S subframes other than subframe #0 in the first radio frame in the window |

In Table 4, signal periodicity for usage change of a radio resource is determined to include 10 ms, 20 ms and 40 ms at least. With respect to the periodicity of 10 ms, the number of X is minimum 4 and subframe #{[Xa, Xb, Xc, . . . ]} includes subframe #{0, 1, 5, 6} at least. With respect to the periodicity of 20 ms, the number of Y is minimum 4 and subframe #{[Ya, Yb, Yc, . . . ]} includes subframe #{0, 1, 5, 6} at least in a second radio frame of the aforementioned application interval. With respect the periodicity of 40 ms, the number of Z is minimum 4 and #{[Za, Zb, Zc, . . . ]} includes subframe #{0, 1, 5, 6} at least in a fourth radio frame of the aforementioned application interval. With respect the periodicity of 80 ms, the number of Q is minimum 4 and subframe #{[Qa, Qb, Qc, . . . ]} includes subframe #{0, 1, 5, 6} at least in an eighth radio frame of the aforementioned application interval. In this case, a user equipment is set not to monitor radio resource usage (re)configuration message in non-SIB-1 downlink/special subframes.

In particular, in '1-1. Configuration of radio resource usage (re)configuration message' and '1-2. Transmission/reception and application of radio resource usage (re)configuration message (UL-DL reconfiguration DCI)', a user equipment (hereinafter called eIMTA UE) set to monitor a multitude of radio resource usage (re)configuration messages (UL-DL reconfiguration DCI) on a multitude of subframes (indicated by bitmap) on radio frame(s) {m·T/10, m·T/10+1, . . . , (m+1)·T/10−1} can be set to: i) decode a previously defined (or signaled) number of radio resource usage (re)configuration messages among a multitude of the radio resource usage (re)configuration messages and then apply valid UL-DL configuration determined per individual cell to a linked valid duration; or ii) decode a multitude of the radio resource usage (re)configuration messages all and then apply valid UL-DL configuration determined per individual cell to a linked valid duration (e.g., {m·T/10, m·T/10+1, . . . , (m+1)·T/10−1} (i.e., "Current"), or {(m+1)·T/10, (m+1)·T/10+1, . . . , (m+2)·T/10−1} (i.e., "Next")), according to first to seventh methods proposed in the following. Moreover, signaling for radio resource usage (re)configuration messages can be signaled through an upper or physical layer.

2. Embodiment of the Present Invention 2-1. First Method

According to a first method of the present invention, a user equipment (hereinafter called eIMTA UE) set to monitor a multitude of radio resource usage (re)configuration messages (UL-DL reconfiguration DCI) on a multitude of subframes (indicated by bitmap) on radio frame(s) {m·T/10, m·T/10+1, . . . , (m+1)·T/10−1} can be set to: i) decode only a previously defined (or signaled) number of radio resource usage (re)configuration messages among a multitude of the radio resource usage (re)configuration messages and then apply valid UL-DL configuration most successfully detected per individual cell to a linked valid duration; or ii) decode a multitude of the radio resource usage (re)configuration messages all and then apply valid UL-DL configuration most successfully detected per individual cell to a linked valid duration.

For instance, the valid UL-DL configuration successfully detected per individual cell may mean at least one of: i)

UL-DL configuration detected as radio resource usage (re)configuration message (UL-DL reconfiguration DCI) related CRC check is true; ii) UL-DL configuration of not changing UL frame on reference DL HARQ timeline related UL-DL configuration for downlink usage; and iii) UL-DL configuration of not changing UL frame on reference DL HARQ timeline related UL-DL configuration for uplink usage.

2-2. Second Method

According to a second method of the present invention, a user equipment (hereinafter called eIMTA UE) set to monitor a multitude of radio resource usage (re)configuration messages (UL-DL reconfiguration DCI) on a multitude of subframes (indicated by bitmap) on radio frame(s) {m·T/10, m·T/10+1, . . . , (m+1)·T/10−1} can be set to: i) decode only a previously defined (or signaled) number of radio resource usage (re)configuration messages among a multitude of the radio resource usage (re)configuration messages and then apply valid UL-DL configuration detected first successfully detected per individual cell to a linked valid duration; or ii) decode a multitude of the radio resource usage (re)configuration messages all and then apply valid UL-DL configuration detected first successfully per individual cell to a linked valid duration. On the contrary, the user equipment may be set to: i) decode only a previously defined (or signaled) number of radio resource usage (re)configuration messages among a multitude of the radio resource usage (re)configuration messages and then apply valid UL-DL configuration detected last successfully detected per individual cell to a linked valid duration; or ii) decode a multitude of the radio resource usage (re)configuration messages all and then apply valid UL-DL configuration detected last successfully per individual cell to a linked valid duration.

For instance, the valid UL-DL configuration successfully detected per individual cell may mean at least one of: i) UL-DL configuration detected as radio resource usage (re)configuration message (UL-DL reconfiguration DCI) related CRC check is true; ii) UL-DL configuration of not changing UL frame on reference DL HARQ timeline related UL-DL configuration for downlink usage; and iii) UL-DL configuration of not changing UL frame on reference DL HARQ timeline related UL-DL configuration for uplink usage.

2-3. Third Method

According to a third method of the present invention, a user equipment (hereinafter called eIMTA UE) set to monitor a multitude of radio resource usage (re)configuration messages (UL-DL reconfiguration DCI) on a multitude of subframes (indicated by bitmap) on radio frame(s) {m·T/10, m·T/10+1, . . . , (m+1)·T/10−1} can be set to: i) decode only a previously defined (or signaled) number of radio resource usage (re)configuration messages (UL-DL reconfiguration DCI) among a multitude of the radio resource usage (re)configuration messages (UL-DL reconfiguration DCI) and then apply a predefined fallback mode related UL-DL configuration to a linked valid duration if all 'successfully detected UL-DL configurations' (or 'successfully detected valid UL-DL configurations') per each cell are not equal to each other; or ii) decode a multitude of the radio resource usage (re)configuration messages (UL-DL reconfiguration DCI) all and then apply a predefined fallback mode related UL-DL configuration to a linked valid duration if all 'successfully detected UL-DL configurations' (or 'successfully detected valid UL-DL configurations') per each cell are not equal to each other. Moreover, if at least one of 'successfully detected UL-DL configurations' (or 'successfully detected valid UL-DL configurations') per each cell is different, the present method can be interpreted as applying a predefined fallback mode related UL-DL configuration to a linked valid duration.

For instance, the term 'UL-DL configuration successfully detected per individual cell' indicates UL-DL configurations detected if radio resource usage (re)configuration message (UL-DL reconfiguration DCI) related CRC check is true. On the other hand, the other term 'valid UL-DL configuration successfully detected per individual cell' indicates UL-DL configurations of not changing UL subframe on reference DL HARQ timeline related UL-DL configuration for DL usage or not changing DL subframe on reference DL HARQ timeline related UL-DL configuration for UL usage as well as UL-DL configurations detected if radio resource usage (re)configuration message (UL-DL reconfiguration DCI) related CRC check is true.

Moreover, per-cell fallback mode related UL-DL configuration may be defined as: i) UL-DL configuration on SIB; ii) reference DL HARQ timeline related UL-DL configuration; iii) reference UL HARQ timeline related UL-DL configuration; or iv) UL-DL configuration applied to radio frame(s) {(m−1)·T/10, (m−1)·T/10+1, . . . , m·T/10−1}.

2-4. Fourth Method

A user equipment (hereinafter called eIMTA UE) set to monitor a multitude of radio resource usage (re)configuration messages (UL-DL reconfiguration DCI) on a multitude of subframes (indicated by bitmap) on radio frame(s) {m·T/10, m·T/10+1, . . . , (m+1)·T/10−1} can be set to decode only a previously defined (or signaled) number of radio resource usage (re)configuration messages among a multitude of the radio resource usage (re)configuration messages (UL-DL reconfiguration DCI) and then apply a predefined fallback mode related UL-DL configuration to a linked valid duration: i) if there are at least two types of the UL-DL configurations most successfully detected per individual cell; or ii) there are at least two types of the valid UL-DL configurations.

Alternatively, the user equipment (hereinafter called eIMTA UE) can be set to decode a multitude of the radio resource usage (re)configuration messages (UL-DL reconfiguration DCI) all and then apply a predefined fallback mode related UL-DL configuration to a linked valid duration: i) if there are at least two types of the UL-DL configurations most successfully detected per individual cell; or ii) there are at least two types of the valid UL-DL configurations.

For instance, assume that a specific user equipment (e.g., Non-CA eIMTA UE) is set to monitor radio resource usage (re)configuration message (UL-DL reconfiguration DCI) on 8 subframes (indicated by bitmap) of radio frame(s) {0, 1}. As a result from decoding the corresponding 8 radio resource usage (re)configuration message (UL-DL reconfiguration DCI), assume that three valid UL-DL configuration #2 and two valid UL-DL configuration #5 are successfully detected (i.e., a case that there are two types of the valid UL-DL configurations detected most successfully). In this case, the corresponding user equipment applies predefined fallback mode related UL-DL configuration to a linked valid duration according to the fourth method.

Moreover, according to the present method, the term 'UL-DL configuration successfully detected per individual cell' indicates UL-DL configurations detected if radio resource usage (re)configuration message (UL-DL reconfiguration DCI) related CRC check is true. On the other hand, the other term 'valid UL-DL configuration successfully detected per individual cell' indicates UL-DL configurations of not changing UL subframe on reference DL HARQ timeline related UL-DL configuration for DL usage or not changing DL subframe on reference DL HARQ timeline related UL-DL configuration for UL usage as well as UL-DL configurations detected if radio resource usage (re)configuration message (UL-DL reconfiguration DCI) related CRC check is true.

Moreover, per-cell fallback mode related UL-DL configuration may be defined as: i) UL-DL configuration on SIB; ii) reference DL HARQ timeline related UL-DL configuration; iii) reference UL HARQ timeline related UL-DL configuration; or iv) UL-DL configuration applied to radio frame(s) $\{(m-1)\cdot T/10, (m-1)\cdot T/10+1, \ldots, m\cdot T/10-1\}$.

2-5. Fifth Method

A user equipment (hereinafter called eIMTA UE) set to monitor a multitude of radio resource usage (re)configuration messages (UL-DL reconfiguration DCI) on a multitude of subframes (indicated by bitmap) on radio frame(s) $\{m\cdot T/10, m\cdot T/10+1, \ldots, (m+1)\cdot T/10-1\}$ can be set to decode only a previously defined (or signaled) number of radio resource usage (re)configuration messages among a multitude of the radio resource usage (re)configuration messages (UL-DL reconfiguration DCI) and then apply a predefined fallback mode related UL-DL configuration to a linked valid duration if at least one 'invalid UL-DL configuration' exists in 'UL-DL configurations most successfully detected' per individual cell. Alternatively, the user equipment (hereinafter called eIMTA UE) can be set to decode a multitude of the radio resource usage (re)configuration messages (UL-DL reconfiguration DCI) all and then apply a predefined fallback mode related UL-DL configuration to a linked valid duration if at least one 'invalid UL-DL configuration' exists in 'UL-DL configurations most successfully detected' per individual cell.

In this case, the term 'UL-DL configuration successfully detected per individual cell' indicates UL-DL configurations detected if radio resource usage (re)configuration message (UL-DL reconfiguration DCI) related CRC check is true.

And, the term 'per-cell invalid UL-DL configuration' indicates one of: i) UL-DL configuration of changing UL subframe on reference DL HARQ timeline related UL-DL configuration for DL usage; and ii) UL-DL configuration of changing DL subframe on reference DL HARQ timeline related UL-DL configuration for UL usage, despite being detected if radio resource usage (re)configuration message (UL-DL reconfiguration DCI) related CRC check is true.

Moreover, per-cell fallback mode related UL-DL configuration may be defined as: i) UL-DL configuration on SIB; ii) reference DL HARQ timeline related UL-DL configuration; iii) reference UL HARQ timeline related UL-DL configuration; or iv) UL-DL configuration applied to radio frame(s) $\{(m-1)\cdot T/10, (m-1)\cdot T/10+1, \ldots, m\cdot T/10-1\}$.

2-6. Sixth Method

According to the present method, on one radio resource usage (re)configuration message (UL-DL reconfiguration DCI) corresponding to UE-group common DCI, a multitude of indicators (e.g., one indicator configured with 3 bits) can be transmitted/configured (cf. '1-1. Configuration of radio resource usage (re)configuration message' and '1-2. Transmission/reception and application of radio resource usage (re)configuration message (UL-DL reconfiguration DCI)') in order for user equipments, which use a multitude of eIMTA mode enabled cells for radio resource usage, or user equipments, which receive cooperative communication (CoMP) service from the eIMTA mode enabled cells for the radio resource usage, to receive UL-DL configuration information related to a multitude of the corresponding cells at a time.

In particular, a specific user equipment can obtain UL-DL reconfiguration information related to a multitude of cells related to communication of its own at a time through: i) indicator fields at some specific location (e.g., a value equal to or smaller than M) previously signaled to a user equipment by a base station; or ii) indicator fields at some specific location derived on the basis of predefined rules, among total M indicator fields defined on one radio resource usage (re)configuration message (UL-DL reconfiguration DCI). In this case, the corresponding one radio resource usage (re)configuration message (UL-DL reconfiguration DCI) can be transmitted on PDCCH common search space (CSS) of PCell.

Hence, considering such an operation, 'UL-DL configurations detected successfully per individual cell', which is described in the at least one or more methods (i.e., some or all of the methods) (e.g., first method, second method, third method, fourth method, and fifth method), can be interpreted as or limited to UL-DL configuration informations received from indicator fields at (some) specific location designated to be actually monitored/received by a specific user equipment among total M indicator fields defined on one radio resource usage (re)configuration message (UL-DL reconfiguration DCI). And, 'valid UL-DL configurations detected successfully per individual cell' can be interpreted as or limited to valid UL-DL configuration informations received from indicator fields at (some) specific location designated to be actually monitored/received by a specific user equipment among total M indicator fields defined on one radio resource usage (re)configuration message (UL-DL reconfiguration DCI).

The case of applying such interpretation/restriction to the third method is described as follows. First of all, a user equipment (eIMTA UE) set to monitor a multitude of radio resource usage (re)configuration messages (UL-DL reconfiguration DCI) on a multitude of subframes (indicated by bitmap) of radio frame(s) $\{m\cdot T/10, m\cdot T/10+1, \ldots, (m+1)\cdot T/10-1\}$ can decode only a previously defined (or signaled) number of radio resource usage (re)configuration messages among a multitude of the radio resource usage (re)configuration messages (UL-DL reconfiguration DCI) or all of a multitude of the radio resource usage (re)configuration messages (UL-DL reconfiguration DCI).

In this case, i) if 'UL-DL configurations successfully detected' or 'valid UL-DL configurations successfully detected' from specific indicator field locations for the actual monitoring/receiving usage related to the corresponding UE (eIMTA UE) on the corresponding individual radio resource usage (re)configuration message (UL-DL reconfiguration DCI) are not the same all, it is able to re-interpret that a predefined fallback mode related UL-DL configuration is applied to a linked valid duration (e.g., case of Non CA of eIMTA-Enable Cells). Alternatively, ii) if 'UL-DL configurations successfully detected' or 'valid UL-DL configurations successfully detected' from specific individual indicator field locations for the actual monitoring/receiving usage related to the (corresponding) UE (eIMTA UE) on the corresponding individual radio resource usage (re)configuration message (UL-DL reconfiguration DCI) are not the same all, it is able to re-interpret that a predefined fallback mode related UL-DL configuration on a cell linked to the indicator field location is applied to a linked valid duration (e.g., case of CA of eIMTA-Enable Cells).

Additionally, in this case, if UL-DL configuration informations received (or successfully detected) from indicator fields at some specific location designated to be actually monitored/received by the (corresponding) UE (eIMTA UE) on the individual radio resource usage (re)configuration message (UL-DL reconfiguration DCI) are the same all but UL-DL configuration informations received (or successfully detected) from indicator fields at different location (e.g., indicator fields linked to another user equipment belonging to the same UE group) are not the same all, the (corresponding) UE (eIMTA UE) regards that all the same 'successfully detected UL-DL configurations' are received on the individual radio resource usage (re)configuration message (UL-DL reconfiguration DCI).

Alternatively, if valid UL-DL configurations received (or successfully detected) from indicator fields at some specific location designated to be actually monitored/received by the corresponding UE (eIMTA UE) on the individual radio resource usage (re)configuration message (UL-DL reconfiguration DCI) are the same all but valid UL-DL configurations received (or successfully detected) from indicator fields at different location (e.g., indicator fields linked to another user equipment belonging to the same UE group) are not the same all, the corresponding UE (eIMTA UE) regards that all the same 'successfully detected valid UL-DL configurations' are received on the individual radio resource usage (re)configuration message (UL-DL reconfiguration DCI).

In this case, the present example implicitly means that reconfiguration periodicity of UEs sharing the same eIMTA-RNTI (cf. '1-1. Configuration of radio resource usage (re)configuration message' and '1-2. Transmission/reception and application of radio resource usage (re)configuration message') or UEs belonging to the same UE group may be different.

On the other hand, for another example, 'UL-DL configurations detected successfully per individual cell', which is described in the at least one or more methods (i.e., some or all of the methods) (e.g., first method, second method, third method, and fourth method), can be interpreted/defined as all UL-DL configuration informations received through total M indicator fields defined on one radio resource usage (re)configuration message (UL-DL reconfiguration DCI). And, 'valid UL-DL configurations detected successfully per individual cell' can be interpreted/defined as all valid UL-DL configuration informations received through total M indicator fields defined on one radio resource usage (re)configuration message (UL-DL reconfiguration DCI).

If such interpretation is applied to the third method, a user equipment (eIMTA UE) set to monitor a multitude of radio resource usage (re)configuration messages (UL-DL reconfiguration DCI) on a multitude of subframes (indicated by bitmap) of radio frame(s) {m·T/10, m·T/10+1, . . . , (m+1)·T/10−1} decodes only a previously defined (or signaled) number of radio resource usage (re)configuration messages (UL-DL reconfiguration DCI) among a multitude of the radio resource usage (re)configuration messages (UL-DL reconfiguration DCI) or all of a multitude of the radio resource usage (re)configuration messages (UL-DL reconfiguration DCI). Thereafter, if 'UL-DL configurations successfully detected' or 'valid UL-DL configurations successfully detected' from all indicator field locations including specific indicator field locations for the actual monitoring/receiving usage related to the corresponding UE (eIMTA UE) on the corresponding individual radio resource usage (re)configuration message (UL-DL reconfiguration DCI) are not the same all, it is able to re-interpret that a predefined fallback mode related UL-DL configuration is applied to a linked valid duration.

Additionally, in this case, if UL-DL configuration informations received (or successfully detected) from indicator fields at some specific location designated to be actually monitored/received by the (corresponding) UE (eIMTA UE) on the individual radio resource usage (re)configuration message (UL-DL reconfiguration DCI) are the same all but UL-DL configuration informations received (or successfully detected) from indicator fields at different location (e.g., indicator fields linked to another user equipment belonging to the same UE group) are not the same all, the (corresponding) UE (eIMTA UE) regards that all the same 'successfully detected UL-DL configurations' are received on the individual radio resource usage (re)configuration message (UL-DL reconfiguration DCI). Alternatively, if valid UL-DL configurations received (or successfully detected) from indicator fields at some specific location designated to be actually monitored/received by the corresponding UE (eIMTA UE) on the individual radio resource usage (re)configuration message (UL-DL reconfiguration DCI) are the same all but valid UL-DL configurations received (or successfully detected) from indicator fields at different location (e.g., indicator fields linked to another user equipment belonging to the same UE group) are not the same all, the corresponding UE (eIMTA UE) regards that all the same 'successfully detected valid UL-DL configurations' are received on the individual radio resource usage (re)configuration message (UL-DL reconfiguration DCI).

In this case, the present example implicitly means that reconfiguration periodicity of UEs sharing the same eIMTA-RNTI (cf. '1-1. Configuration of radio resource usage (re)configuration message' and '1-2. Transmission/reception and application of radio resource usage (re)configuration message') or UEs belonging to the same UE group is the same.

2-7. Seventh Method

For instance, on one radio resource usage (re)configuration message (UL-DL reconfiguration DCI) corresponding to UE-group common DCI, a multitude of indicators (e.g., one indicator configured with 3 bits) can be transmitted (or configured) (cf. '1-1. Configuration of radio resource usage (re)configuration message' and '1-2. Transmission/reception and application of radio resource usage (re)configuration message (UL-DL reconfiguration DCI)') in order for user equipments, which use a multitude of eIMTA mode enabled cells for radio resource usage, or user equipments, which receive cooperative communication (CoMP) service from the eIMTA mode enabled cells for the radio resource usage, to receive UL-DL configuration information related to a multitude of the corresponding cells at a time.

In particular, a specific user equipment can obtain UL-DL reconfiguration information related to a multitude of cells related to communication of its own at a time through indicator fields at some specific location (e.g., a value equal to or smaller than M) previously signaled to a user equipment by a base station (or, through indicator fields at some specific location derived on the basis of predefined rules) among total M indicator fields defined on one radio resource usage (re)configuration message (UL-DL reconfiguration DCI). In this case, the corresponding one radio resource usage (re)configuration message (UL-DL reconfiguration DCI) can be transmitted on PDCCH common search space (CSS) of PCell.

Considering such an operation, reception information of a specific user equipment in the at least one or more methods (i.e., some or all of the methods) (e.g., first method, second method, third method, fourth method, and fifth method) can be defined as 'information received only from indicator fields at some specific location designated to be actually monitored/received by the specific user equipment among total M indicator fields defined on radio resource usage (re)configuration message (UL-DL reconfiguration DCI) at a multitude of radio resource usage (re)configuration message (UL-DL reconfiguration DCI) monitoring timing points' or 'information received through total M indicator fields defined on radio resource usage (re)configuration message (UL-DL reconfiguration DCI) at a multitude of radio resource usage (re)configuration message (UL-DL reconfiguration DCI) monitoring timing points'.

In this case, when the definition as 'information received only from indicator fields at some specific location designated to be actually monitored/received by the specific user equipment among total M indicator fields defined on radio resource usage (re)configuration message (UL-DL reconfiguration DCI) at a multitude of radio resource usage (re)configuration message (UL-DL reconfiguration DCI) monitoring timing points' is applied to the third method, if UL-DL configuration informations received from indicator fields at some specific location designated to be actually monitored/received by the UE (eIMTA UE) on the individual radio resource usage (re)configuration message (UL-DL reconfiguration DCI) are the same all but UL-DL configuration informations received from indicator fields at different location (e.g., indicator fields linked to another user equipment belonging to the same UE group) are not the same in part at least (i.e., all or some), the corresponding UE (eIMTA UE) regards that all the same informations are received on the individual radio resource usage (re)configuration message (UL-DL reconfiguration DCI). In this case, such method/interpretation implicitly means that reconfiguration periodicity of UEs sharing the same eIMTA-RNTI (cf. '1-1. Configuration of radio resource usage (re)configuration message' and '1-2. Transmission/reception and application of radio resource usage (re)configuration message') (or UEs belonging to the same UE group) may be different.

Moreover, for example, when the method/interpretation defined as 'information received through total M indicator fields defined on radio resource usage (re)configuration message (UL-DL reconfiguration DCI) at a multitude of radio resource usage (re)configuration message (UL-DL reconfiguration DCI) monitoring timing points' is applied to the third method, if UL-DL configuration informations received from indicator fields at some specific location designated to be actually monitored/received by the UE (eIMTA UE) on the individual radio resource usage (re)configuration message (UL-DL reconfiguration DCI) are the same all but UL-DL configuration informations received from indicator fields at different location (e.g., indicator fields linked to another user equipment belonging to the same UE group) are not the same in part at least (i.e., all or some), the corresponding UE (eIMTA UE) regards that different informations are received on the individual radio resource usage (re)configuration message (UL-DL reconfiguration DCI). In this case, such method/interpretation implicitly means that reconfiguration periodicity of UEs sharing the same eIMTA-RNTI (cf. '1-1. Configuration of radio resource usage (re)configuration message' and '1-2. Transmission/reception and application of radio resource usage (re)configuration message') (or UEs belonging to the same UE group) is the same.

At least one (i.e., some or all) of the first to seventh methods described in the present invention may be set to apply only to some predefined cases limitedly. For instance, the embodiments of the present invention may be set to be limitedly apply to: i) specific system environment (e.g., FDD system, TDD system); ii) RRC-CONNECTED or IDLE mode of UE only; iii) case that dynamic change (eIMTA) mode for radio resource usage is enabled; or iv) specific eIMTA-enabled component carrier (CC) or specific eIMTA-enabled cell (e.g., PCell, SCell) in component aggregation (CA) applied environment only.

Since the embodiments described in the methods of the present invention can be included as one of methods for implementing the present invention as well, it is apparent that such embodiments can be regarded as a sort of independent methods. Although the aforementioned methods of the present invention can be implemented independently, at least one or more embodiments of the present invention can be implemented in a manner of being combined/merged in part or entirely.

Moreover, information on the aforementioned rules/configurations/methods of the present invention, information on whether to apply the corresponding rules/configurations/methods and the like can be notified to a user equipment by a base station through predefined signal (e.g., physical layer signal, upper layer signal).

Figure 13:
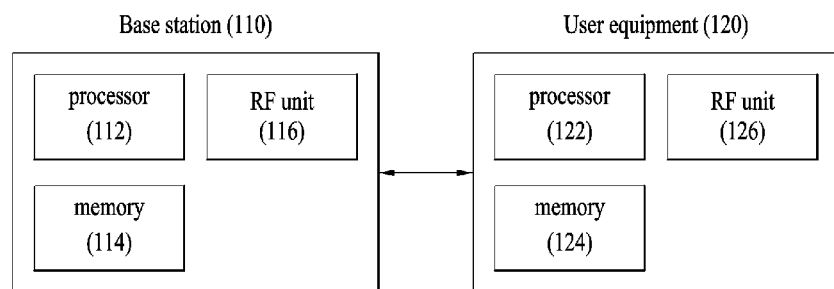
FIG. 13 shows a base station and a user equipment applicable to one embodiment of the present invention.

FIG. 13 shows one example of a base station and a user equipment applicable to one embodiment of the present invention.

If a relay is included in a wireless communication system, a communication in backhaul link is performed between a base station and a relay. And, a communication in access link is performed between a relay and a user equipment. Hence, the base station or user equipment shown in the drawing may be substituted with a relay in some cases.

Referring to FIG. 13, a wireless communication system includes a base station (BS) 110 and a user equipment (UE) 120. The BS 110 includes a processor 112, a memory 114, and a Radio Frequency (RF) unit 116. The processor 112 may be configured to perform the proposed procedures and/or methods according to the present invention. The memory 114 is connected to the processor 112 and stores various types of informations related to operations of the processor 112. The RF unit 116 is connected to the processor 112 and transmits and/or receives radio signals. The UE 120 includes a processor 122, a memory 124, and an RF unit 126. The processor 122 may be configured to perform the proposed procedures and/or methods according to the present invention. The memory 124 is connected to the processor 122 and stores various information related to operations of the processor 122. The RF unit 126 is connected to the processor 122 and transmits and/or receives radio signals. The BS 110 and/or the UE 120 may include a single antenna or multiple antennas.

The embodiments of the present invention described above are combinations of elements and features of the present invention in a predetermined form. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. 'Base station (BS)' may be substituted with such a terminology as a fixed station, a Node B, an eNode B (eNB), an access point (AP) and the like.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method of transceiving a signal in a wireless communication system and apparatus therefor are described mainly with reference to examples applied to 3GPP LTE system, as mentioned in the foregoing description, the present invention is applicable to various kinds of wireless communication systems as well as to the 3GPP LTE system.

What is claimed is:

1. A method for transmitting a signal by a base station (BS) in a wireless communication system, the method comprising:
transmitting, to a user equipment (UE), first information and second information on a time division duplex (TDD) uplink-downlink (UL-DL) configuration for a serving cell,
wherein the first information includes information on a location of an information field for the serving cell among information fields within downlink control information (DCI), and
wherein the second information includes information on a periodicity and an offset for monitoring a physical downlink control channel (PDCCH) by the UE;
transmitting, to the UE, the PDCCH with the DCI based on the periodicity and the offset, wherein the DCI includes the information fields, and wherein an information field including the TDD UL-DL configuration among the information fields is included in a position indicated by the location of the information field,
wherein the TDD UL-DL configuration is used within a pre-defined time duration starting from a current time unit where the DCI is received by the UE, and the pre-defined time duration is equal to the periodicity for monitoring the PDCCH.

2. The method of claim 1, wherein each of the information fields is configured with 3 bits.

3. The method of claim 1, wherein the DCI is transmitted through common search space (CSS) on the PDCCH.

4. The method of claim 1, wherein the DCI is Cyclic Redundancy Check (CRC) scrambled based on a radio network temporary identifier (RNTI) defined for determining the TDD UL-DL configuration.

5. A base station (BS) for transmitting a signal in a wireless communication system, the BS comprising:
a radio frequency (RF) unit configured to transmit and receive signals; and
a processor, wherein the processor is configured to:
control the RF unit to transmit, to a user equipment (UE), first information and second information on a time division duplex (TDD) uplink-downlink (UL-DL) configuration for a serving cell,
wherein the first information includes information on a location of an information field for the serving cell among information fields within downlink control information (DCI), and
wherein the second information includes information on a periodicity and an offset for monitoring a physical downlink control channel (PDCCH);
control the RF unit to transmit, to the UE, the PDCCH with the DCI based on the periodicity and the offset, wherein the DCI includes the information fields, and wherein an information field including the TDD UL-DL configuration among the information fields is included in a position indicated by the location of the information field,
wherein the TDD UL-DL configuration is used within a pre-defined time duration starting from a current time unit where the DCI is received by the UE, and the pre-defined time duration is equal to the periodicity for monitoring the PDCCH.

6. The base station of claim 5, wherein each of the information fields is configured with 3 bits.

7. The base station of claim 5, wherein the DCI is transmitted through common search space (CSS) on the PDCCH.

8. The base station of claim 5, wherein the DCI is Cyclic Redundancy Check (CRC) scrambled based on a radio network temporary identifier (RNTI) defined for determining the TDD UL-DL configuration.

9. A processor for a based station (BS) for transmitting a signal in a wireless communication system,
wherein the processor is configured with processor-executable instructions to control the UE including a receiver to carry out the following steps:
transmitting, to a user equipment (UE), first information and second information on a time division duplex (TDD) uplink-downlink (UL-DL) configuration for a serving cell,
wherein the first information includes information on a location of an information field for the serving cell among information fields within downlink control information (DCI), and wherein the second information includes information on a periodicity and an offset for monitoring a physical downlink control channel (PDCCH);

transmitting, to the UE, the PDCCH with the DCI based on the periodicity and the offset, wherein the DCI includes the information fields, and wherein an information field including the TDD UL-DL configuration among the information fields is included in a position indicated by the location of the information field, wherein the TDD UL-DL configuration is used within a pre-defined time duration starting from a current time unit where the DCI is received by the UE, and the pre-defined time duration is equal to the periodicity for monitoring the PDCCH.

10. The processor of claim 9, wherein each of the information fields is configured with 3 bits.

11. The processor of claim 9, wherein the DCI is transmitted through common search space (CSS) on the PDCCH.

12. The processor of claim 9, wherein the DCI is Cyclic Redundancy Check (CRC) scrambled based on a radio network temporary identifier (RNTI) defined for determining the TDD UL-DL configuration.

* * * * *